US00RE38872E

(19) United States
(12) Reissued Patent
Hayes

(10) Patent Number: US RE38,872 E
(45) Date of Reissued Patent: Nov. 15, 2005

(54) VACUUM EXCAVATION APPARATUS HAVING AN IMPROVED AIR LANCE, AIR LANCE NOZZLE, AND VACUUM SYSTEM INCLUDING A MULTISTAGE VENTURI EJECTOR

(75) Inventor: Paul Hayes, Richmond, VA (US)

(73) Assignee: Utiliscope Corporation, Glen Allen, VA (US)

(21) Appl. No.: 09/984,746

(22) Filed: Oct. 31, 2001

Related U.S. Patent Documents

Reissue of:
(64) Patent No.: 6,000,151
Issued: Dec. 14, 1999
Appl. No.: 08/810,756
Filed: Mar. 4, 1997

(51) Int. Cl.[7] ..... E02F 3/88
(52) U.S. Cl. ..... 37/323; 175/67
(58) Field of Search ..... 37/307, 317, 322, 37/323; 172/22, 23; 175/66, 67, 424, 324, 213; 406/88, 96, 162, 157

(56) References Cited

U.S. PATENT DOCUMENTS

| | | | |
|---|---|---|---|
| 1,137,767 | A | 5/1915 | LeBlanc |
| 1,496,635 | A | 6/1924 | Higley |
| 2,655,408 | A | 10/1953 | Williams |
| 2,785,926 | A | 3/1957 | LaTaste |
| 3,177,635 | A | 4/1965 | Cawl et al. |
| 3,512,841 | A | 5/1970 | Kollasch et al. |
| 3,853,079 | A | 12/1974 | Dunne |
| 3,861,598 | A | 1/1975 | Fleischer |
| 3,971,096 | A | 7/1976 | Renholt |
| 4,112,695 | A | 9/1978 | Chang et al. |
| 4,633,957 | A | 1/1987 | Prost |
| 4,696,625 | A | 9/1987 | Greenberg |
| 4,776,731 | A | 10/1988 | Briggs et al. |
| 4,936,031 | A | 6/1990 | Briggs et al. |
| 5,050,340 | A | 9/1991 | Seifert |
| 5,140,759 | A | 8/1992 | Artzberger |
| 5,170,943 | A | 12/1992 | Artzberger |
| 5,212,891 | A | 5/1993 | Schuermann et al. |
| 5,361,855 | A | 11/1994 | Schuermann et al. |
| 5,487,236 | A | 1/1996 | Moon |
| 5,494,124 | A | 2/1996 | Dove et al. |

*Primary Examiner*—Robert E. Pezzuto
(74) *Attorney, Agent, or Firm*—Bacon & Thomas, PLLC

(57) ABSTRACT

A vacuum excavation system which incorporates a low consumption air lance, a highly efficient multi-stage vacuum generation system effectively isolated from the waste stream and the air source, and a highly portable material collection system. The air lance includes a cylindrical main body which narrows to a flat taper nozzle at the digging end, and a tee-shaped handle with a swivel type air fitting at one end, while the vacuum generation system is a multi-stage ejector fitted onto a collection drum and consisting of successive venturi tubes with pressure equalizing check valves on the second and higher stages, the material collection system consisting of the drum and hoses or pipes connected to the drum through a separate opening. The system can be powered entirely by one 185 cfm portable air compressor, available from local tool rental firms if one is not owned, so than nearly any contractor, utility company, or design firm can easily outfit themselves for vacuum excavation, at a cost for the excavation system less the air compressor of less than one tenth that of a conventional system.

11 Claims, 3 Drawing Sheets

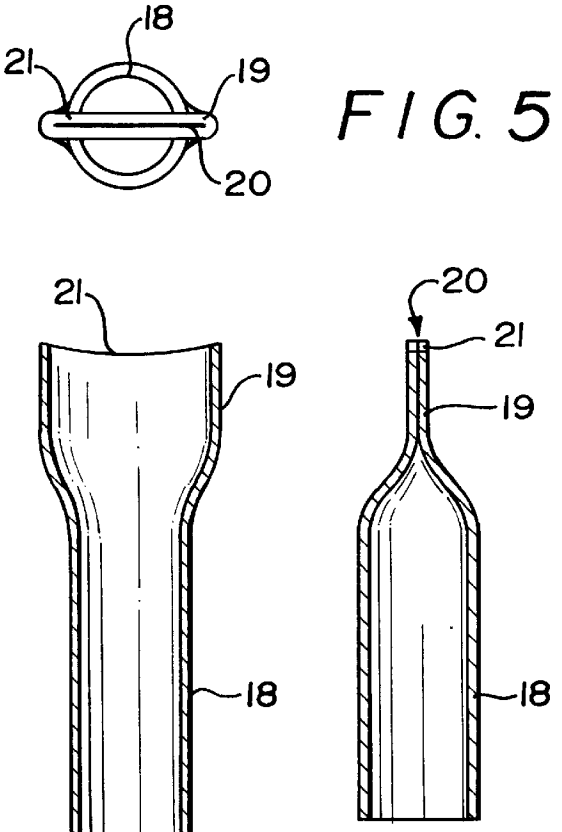
FIG. 5
FIG. 4
FIG. 3
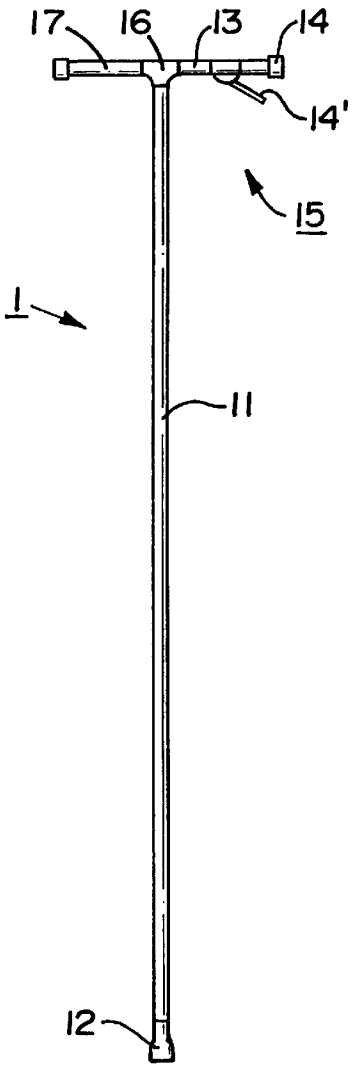
FIG. 2

VACUUM EXCAVATION APPARATUS HAVING AN IMPROVED AIR LANCE, AIR LANCE NOZZLE, AND VACUUM SYSTEM INCLUDING A MULTISTAGE VENTURI EJECTOR

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to excavation apparatus of the type which employs high velocity air to loosen soil and a pneumatic vacuum to remove the loosened soil, and in particular to excavation apparatus having an improved air lance nozzle with a blade-shaped orifice, an improved air lance adapted to be rotated during excavation, and an improved pneumatic vacuum system including a multistage venturi ejector adapted to be fitted on a material collection container.

2. Discussion of Related Art

The concept of vacuum excavation has been discussed in a number of prior patents. U.S. Pat. Nos. 4,776,781, 4,936,031, 5,140,759, and 5,361,855 all disclose pneumatic soil excavation systems in which a jet of air is directed against a mass of soil by a hand-held nozzle to cause the mass to break up, and in which the loosened soil is collected by entraining it in an air flow carried by a pipe or conduit, and depositing the entrained soil at a site away from the excavation.

The theory underlying the concept of vacuum excavation is well-known. Essentially, application of supersonic jets of air causes local fracturing of the soil and rapid release of expanding high pressure air trapped within the soil at the local fracture sites. The fracturing and gas-release properties of the soil are not shared by man-made structures buried within the soil, such as natural gas lines, water pipes, sewer lines, and the like, and thus these structures are unaffected by the supersonic air jets.

Loosening of the soil by local fracturing and rapid expansion of gases trapped in the soil rather than by direct impact means that the air delivery device generates relatively low reaction forces and can be manipulated by a single person. Vacuum excavation therefore increases productivity relative to hand-excavation methods, i.e., shovels, without sacrificing precision, significantly reducing visible alteration of local landscaping or paving. In addition, the use of a high vacuum for material collection causes an effective evacuation of solid material from difficult to reach areas such as beneath or behind pipes, where shovels cannot fit or are difficult to maneuver.

Despite these advantages, however, the conventional vacuum excavation systems have a number of disadvantages that have prevented their widespread use. On the air lance side of the apparatus used in the conventional systems, the disadvantages include difficulties in handling the air lance, which conventionally must be "bounced" up and down to loosen layers of soil across an area of the excavation, and the need for a larger air supply than is available from the type of air compressor commonly used by contractors to operate pneumatic equipment. On the material collection side of the conventional vacuum excavation apparatus, the disadvantages include both the high initial cost of the vacuum generating equipment, and high maintenance costs.

One of the reasons for the large air consumption on the air lance side of the apparatus is the low resistance provided by the conventional cylindrical nozzle or pipe nipple. Because of this problem, nearly all companies currently performing vacuum excavation are forced to use high volume (100 cubic feet per minute (cfm) or greater) high pressure compressed air for soil breakup.

In order for an air lance to be an effective digging tool, the air must exit the lance at supersonic velocity which creates a shock wave in the air, and in order to create a shock wave at the tip of a ¼ inch pipe nipple, a high volume of high pressure air is needed. The typical air lance consists of ¾ or 1 inch internal diameter pipe with a reducer and a ¼ inch internal diameter pipe nipple at the digging end, and is supplied by a vehicle-mounted engine driven air compressor having an airflow rating of 180 cfm or greater. Since the most commonly available compressor has a rating of 185 cfm, the conventional cylindrical air lance requires the full power of the compressor, leaving the compressor unavailable for use as an air supply for a vacuum system, or to power other equipment, thus necessitating a separate engine driven vacuum pump.

On the vacuum collection side of the conventional vacuum excavation apparatus, most vacuum excavation systems employ vacuum pump and engine systems that require use of positive displacement blowers and various stages of filtration or cyclonic separation between the collection container and the positive displacement blowers, as the blowers are very susceptible to internal damage from particulates passing into the motive sections. Motors to drive the positive displacement blowers in the conventional vacuum pump and engine systems vary but generally range between 15 and 50 hp, with some systems making use of power take off linkage from the vehicle on which the unit is mounted.

In addition to being expensive and difficult to maintain, such systems are difficult to transport, and generally can only effectively access locations less than 25 feet from the vacuum source. The V-belts, filters, and internal combustion engines associated with vacuum pump/engine systems require complicated maintenance, which is compounded by the typically dirty and dusty work environments in which they are used, with those systems utilizing truck mounted hoppers being especially difficult to clean. In addition, conventional excavation systems of this type have poor water handling capabilities, since water can contaminate the vacuum generating equipment and especially the filters. Such systems can obviously not be taken indoors or up to work zones in high rise buildings.

While systems have also been proposed which use venturi-type ejectors to generate the vacuum and thereby reduce maintenance costs by eliminating the need for complex filtration or cyclonic separation systems, the conventional venturi systems require high air volumes (450 CFM or more) to generate an effective suction, and therefore require the use of large high cost air compressors and high volume connection hoses, which negates the advantage of simplicity offered in theory by the venturi engine concept.

The ultimate effect of these disadvantages is that, in order to begin using a conventional vacuum excavation system, an initial investment of greater than $100,000.00 is required, with significantly increased operating costs to be expected during the life of the system. This puts the cost of vacuum excavation apparatus out of reach of virtually all private contractors, not to mention others who might benefit from an inexpensive air lance and material removal system. On the other hand, the apparatus of the invention, as described below, currently has a cost of approximately one fourth the minimum cost of the conventional systems, and far lower transportation and maintenance costs.

SUMMARY OF THE INVENTION

It is accordingly an objective of the invention to provide an improved vacuum excavation system having greater versatility, lower maintenance, and lower initial costs than conventional vacuum excavation systems.

It is a second objective of the invention to provide a vacuum excavation system which uses a single portable air compressor of the type commonly used to operate tools at construction sites, as opposed to a dedicated positive displacement blower, or unusually large air compressor.

It is a third objective of the invention to provide a vacuum excavation system which can be maintained by daily cleanup of the vacuum engine, pickup pipe or hose, and collection drum, and in which the portable air compressor can be remotely located. The system has no need for filters or cyclonic separators between the vacuum source and the collection stream.

It is a fourth objective of the invention to provide a vacuum excavation system with improved water handling capabilities, and which can therefore be used for utility vault drainage, eliminating the need for a trash pump, and which can provide dewatering apparatus capable of 200 gpm transfer at 15 foot lift.

It is a fifth objective of the invention to provide a vacuum excavation system which occupies a reduced footprint and is modular.

These objectives are achieved by making three principal improvements to the conventional systems:

The first principal improvement involves an improved air lance nozzle which provides reduced air consumption by replacing the ¼ inch cylindrical pipe nipple of conventional systems with an elongated blade-like structure that achieves supersonic airflow through the use of a slit having a gap of only 0.01 or 0.02 inches and a width of approximately 1.5 inch.

The second principal improvement is to combine the blade style orifice of the improved nozzle with an air lance made of thin wall tempered pipe and a T-shape handle to enable rotation of the lance, a swivel adapter on the air supply hose, and a lever style valve placed at the fingertips of the operator, to enable spinning of the air lance, in place of the conventional technique of bouncing the nozzle up and down on the soil. This provides improved control for digging of larger holes, and enables digging of pilot holes by rotation of the lance without the need for vacuum removal of the soil.

The third principal improvement is to combine the improved nozzle and air lance structure with the use of a separate vacuum structure featuring a highly efficient multistage venturi ejector which generates the vacuum at the spoil container near the excavation site, permitting the use of a remote compressor and eliminating the need for separate engines and extensive filtering between the vacuum pump and the excavation.

The invention thus provides a vacuum excavation system which incorporates a low air consumption lance, a highly efficient multi-stage vacuum generation system in which the compressor is isolated from the waste stream, and a highly portable material collection system. The system can be powered entirely by one 185 cfm portable air compressor, available from local tool rental firms if one is not owned, so that nearly any contractor, utility company, or design firm can easily outfit themselves for vacuum excavation, at a cost for the excavation system less the air compressor of less than one tenth that of a conventional system, and the compressor can easily be carried by a ½ ton pickup truck and located at distances greater than 200' from the excavation site using standard 1" compressed air hose to connect the compressor to the vacuum engine which drives the collection system, rather than being limited to a location 25' from the vacuum equipment.

A benefit of the preferred nozzle is that it can be used to bore a small "pilot hole" quickly and with little effort even in the hardest soils. This is accomplished by placing the nozzle on the ground, providing 90 psi compressed air, and rotating the nozzle 180 degrees back and forth. Because the blade style orifice of the nozzle is wider than the pipe connecting it to the tee handle, the spoil and compressed air can escape upward through the resulting annulus between the sides of the hole and the pipe, clearing the way for further progress of the lance assembly. The device has been found to easily bore 1" pilot holes to depths of over twenty feet. When performing vacuum excavation to locate utilities, it is very advantageous to perform 1" pilot holes to search for the utility instead of digging full size 12" holes with the lance and vacuum combination.

The curved face of the nozzle reduces contact wear on the orifice and helps to guide the lance straight downward through the soil. The blade effect of the nozzle also permits it to move rocks out of the way by simply spinning the air lance with the tee-shaped handle. Without the tee-shaped handle the nozzle loses much of its effectiveness because it becomes very difficult to spin the lance assembly. Other air lance designs require the operator to bounce the nozzle up and down on the soil, whereas the preferred design uses rotation, which requires much less effort, especially when the excavation is over six feet deep and the air lance is heavy due to the long pipe needed between the tee-shaped handle and the nozzle. At 90 psi, the nozzle of the invention consumes about 45 SCFM of compressed air. To perform the same amount of excavation work, a round orifice design would have to consume 90 to 150 SCFM.

The three stage vacuum engine of the preferred embodiment of the invention thus has several advantages related to practicality, the first of which is that conventional ejectors do not produce sufficient flow through a 4" hose to be effective, and a 4" hose is the minimum size of hose necessary to clear spoil from an excavation. In addition, the invention provides spoil containment in accordance with local regulations, and can operate effectively with a minimal 167 CFM air source. A single stage venturi of the type used in prior vacuum (excavation) systems would not produce enough flow through a 4" pick-up hose to be effective, whereas the multi-stage venturi engine of the invention generates over 800 cfm of flow through the same 4" hose.

Finally, the use of an air lance separate from the vacuum pick up allow both to be easily lengthened for use on deep excavations, in addition to permitting the digging of pilot holes which do not require use of a vacuum pick-up.

The potential applications for the system are widespread, including underground utility exploration, roadwork cleanup, valve box maintenance, water and gas leak detection and repair, pipeline corrosion prevention system installation and repair, gutter cleaning, residential and commercial chimney cleaning, smokestack cleaning, hazardous waste recovery, directional drilling mud removal, leaf collection, aggregate transfer, general high volume wet and dry vacuuming, and numerous others which will occur to those skilled in the art.

BRIEF DESCRIPTION OF THE DRAWINGS

FIG. 2 is a plan view of an air lance constructed according to the principles of the preferred embodiment of the invention.

FIG. 3 is a plan view of a nozzle for the air lance of FIG. 2.

FIG. 4 is a side view of the nozzle illustrated in FIG. 3.

FIG. 5 is an end view of the nozzle illustrated in FIGS. 3 and 4.

DETAILED DESCRIPTION OF THE PREFERRED EMBODIMENTS

Figure 1:
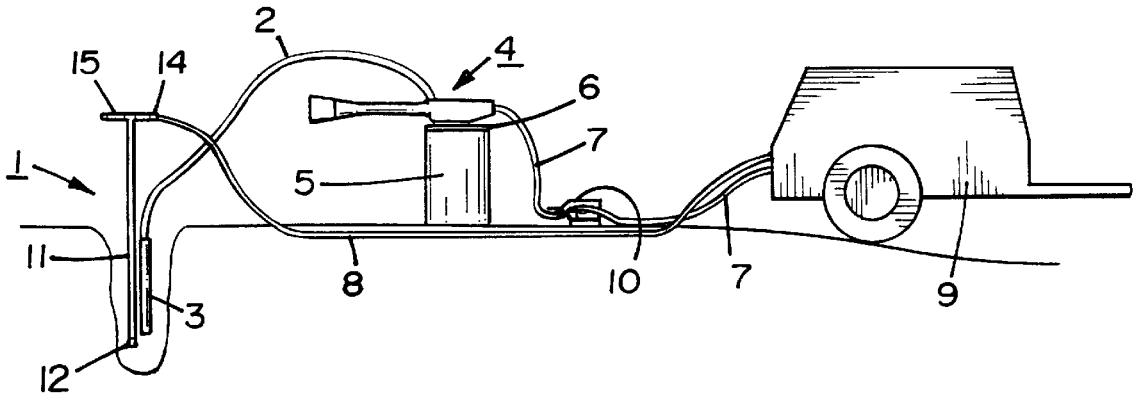
FIG. 1 is a side view showing the overall excavation system of the preferred embodiment.

As shown in FIG. 1, the vacuum excavation system of the invention includes an air lance 1 arranged to direct air at supersonic speeds at a material to be excavated, and a material pickup hose 2 arranged to remove the loosened dirt from the excavation. The material pick-up hose 2 can be an ordinary hose, PVC pipe, or combinations of hoses and pipes, preferably having at least a 4" diameter for soil excavation applications, although hose 2 is illustrated in FIG. 1 as being fitted with a PVC extension pipe or wand 3, pipe 3 being replaceable with longer or shorter extension pipes depending on the depth of the excavation.

The pickup hose is connected to a vacuum engine 4, described in greater detail below, which in turn is attached to an airtight material collection drum 5 via a drum head adapter 6, also described in more detail below. The air supply for the vacuum engine and the air supply for the air lance are both supplied by ¾" standard compressed air hoses 7 and 8 from a single portable air compressor 9, with the vacuum engine 4 being operated by a foot operated air valve 10. Although illustrated as being just a few feet away, compressor 9 can easily be located more than 200' away from the vacuum engine 4 and air lance 1, the only limitation being the ability of the standard hoses to carry a sufficient flow of compressed air from the compressor to the lance and vacuum engine.

As illustrated in more detail in FIG. 2, the air lance includes a pipe 11 having a flat taper nozzle 12 at the digging end, and a transversely extending pipe 13 at the opposite end, pipe 11 and pipe 13 being in communication to provide an airflow path between the air supply hose 8 and the nozzle 12. Pipe 13 serves as at least part of the handle 15 for the air lance, with handle 15 and pipe 11 forming a "T" or tee shape. Of course, since a portion of the handle 15 is not directly in the air path, it does not need to be formed of pipe, although the use of a t-fitting 16 is used to connect pipe 13 to pipe 11 easily enables a capped portion of pipe 17 to be coupled to the fitting to complete the handle.

Preferably, one end of pipe 13 is provided with a swivel fitting 14 to connect the air lance with the compressed air supply hose 8 while permitting rotation of the air lance without kinking of the air supply hose. Fitting 14 may be in the form of a "Chicago"-type female fitting, with the connection being provided with a lever style valve 14' to permit operator control of the air supply.

As illustrated in FIGS. 3–5, the improved nozzle includes a cylindrical extension 18 arranged to be coupled to the end of pipe 11 by any convenient means such as an annular weld, and a flattened end 19 which forms an elongated structure having a blade type orifice 20 with a gap width of significantly less than the ¼ inch diameter of the conventional cylindrical nozzle, and preferably on the order of approximately 0.01 to 0.02 inches and a length approaching 1.5 inches. As a result, the air in the pipe 11, which has an internal diameter of ¾ inches and a cross-sectional area of 0.44 $in^2$, is forced through an area tat the gap of 0.015 to 0.03 $in^2$ to create a sheet of jetted air focused directly in front of the nozzle, and thereby accelerated to supersonic velocity, creating a shock wave which fractures and causes loosening of the soil as described above.

Preferably, the nozzle lip 21 is given a concavity as seen looking down on the flattened surface in FIG. 3. The concavity is not believed to have an effect on the airflow, but serves to reduce contact wear on the orifice and helps to guide the air lance straight downward through the soil.

In operation, the air lance is set on the ground in a vertical orientation and the handle 11 twisted back and forth to dig a small diameter probe hole to a depth limited only by the length of the air lance with very little operator exertion. This is useful in exploration efforts to locate buried utilities and avoids the digging of large holes. Once the underground utility 9 is encountered, the larger hole can be dug by combining the air lance and the pneumatic vacuum system described below. Any size hole can be created, allowing for simple inspection for size and condition or a very complicated repair, and the blade effect of the nozzle also permits it to move rocks out of the way by simply spinning the air lance with the tee handle.

As indicated above and shown in FIG. 1, the vacuum system comprises a tube or wand 3, a flexible conduit 2, a container 5 in the form of an airtight drum, and a pressure or flow responsive engine or injector device 4 that pulls air and loosened soil from the excavation hole successively through the wand 3, the flexible conduit 2, and into the drum 5. In this arrangement, the excavated soil separates from the air stream during passage of the air through the drum to the intake of the vacuum engine, thereby at least partially isolating the vacuum engine from the source of contamination, while the one-way nature of the air supply completely isolates the compressor.

Figure 6:
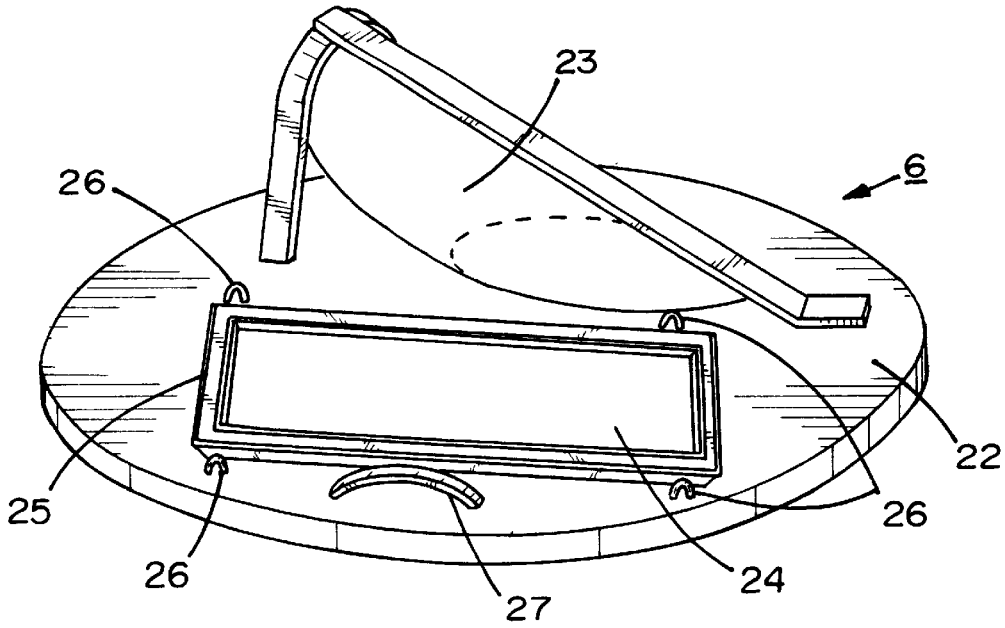
FIG. 6 is an isometric view of a drum head adapter for use in the excavation system of the preferred embodiment of the invention.

As illustrated in FIGS. 1 and 6, the vacuum engine 4 is attached to the drum 5 via an adapter 6 which is made up of a lid 22 adapted to fit over the drum and form an airtight seal to ensure maximum airflow through the drum. The evacuation hose 2 enters the drum through an intake conduit 23, hose 2 having in the preferred embodiment an outer diameter of approximately 4.0" and being attachable to intake conduit 23 by any suitable hose attachment means. Intake conduit 23 is angled relative to the plane of the lid and located off the axis of the drum. A second opening 24 in adapter 6 is shaped to conform to the base of the vacuum engine 4 to provide an air outlet and is provided with a mounting flange and gasket arrangement 25, including fastening means 26, which receives and secures the base of the engine and seals opening 24. Fastening means 26 are preferably arranged so as to permit easy removal and installation of the engine to facilitate cleaning and maintenance, while the adapter as a whole preferably includes means, including seals and attachment fittings (not shown) as well as, for example, carrying handles 27 (only one of which is shown), to facilitate both attachment to and removal from the collection drum so that drums can be replaced as they become full. The design of the system is such that very little debris passes through the drum into the engine itself. Nevertheless, the engine can easily be removed from the adapter for cleaning with brushes or high power spray washing with a radial spray nozzle.

Figure 7:
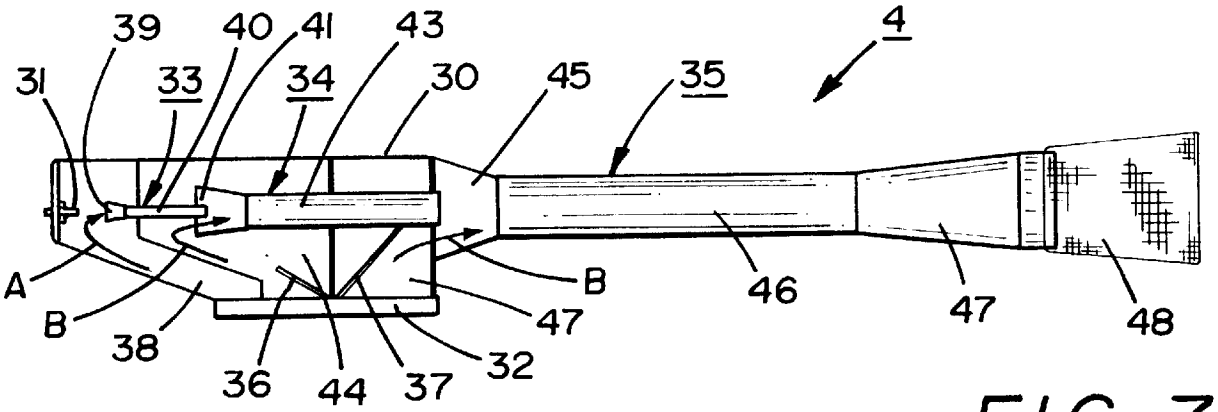
FIG. 7 is a cut-away view of a vacuum engine constructed according to the principles of the preferred embodiment of the invention.

The vacuum engine 4, as shown in FIG. 7, is made up of a housing 30 containing at a front end a nozzle 31 that converts high pressure air entering from hose 7 into a jet. The jet of air draws air from the drum via opening 24 and through the open base 32 of the engine as it passes sequentially through a series of venturi tubes 33, 34, and 35 with pressure equalizing check valves 36 and 37 to provide a three stage suction arrangement pulling the soil collection stream through conduit 2 and into the drum.

As the high pressure air jet from nozzle 31 passes through a first chamber 38 into the opening 39 of venturi tube 33 and then into reduced diameter section 40, it draws air at a relatively high pressure from the drum through chamber 38, as indicated by arrow A. This air is injected into the opening 41 of second venturi tube 34, enters reduced diameter section 43 and draws air from the drum via second chamber 44 through check valve 36, as indicated by arrow B, and the output of venturi tube 34 enters the opening 45 and reduced diameter section 46 of venturi tube 35 to draw air from the drum through chamber 47 via check valve 37, as indicated by arrow C. Finally, the combined airstream, which by this stage is relatively low in pressure, is exhausted through opening 47 of venturi tube 35 and through a low impedance filter 48 as necessary for filtering any particulates still present in the airstream. For typical soil excavation applications, filter 48 may, for example, take the form of a 250 micron filter bag.

As is apparent from FIG. 7, venturi tubes 33–35 increase in length and diameter from the first stage at the front of the engine to the third stage at the exhaust end of the engine, while the shapes of the chambers 38, 44, and 47 are such that the openings at the bottoms of the chambers become progressively larger as the main airstream loses velocity due to the increasing size of the venturi tubes, and the upper portions of the chambers are extended to accommodate the lengths of the venturi tubes. The relative volumes and exact shapes of the chambers are actually a matter of convenience given the constraints resulting from the lengths of the venturi tubes and the size of the opening at the bottom of the engine, but it is possible that the shapes of the chambers could have some effect on the airflow and be adjusted accordingly.

Check valves 36 and 37 are in the form of pressure sensitive check valves associated with each chamber to control air passage from the drum to the last chamber by moving in response to pressure differences in the chamber and the pressure in the container.

More specifically, the check valves remain open when the system is operating with low resistance, as is the case during most vacuum pickup functions of loose debris, the flow of air from the intake nozzle 31 taking along with it air from the chamber surrounding the venturi tube it passes through, so that the initial quantity of pressurized air together with the air brought with it will flow out from the first chamber through the first venturi tube into the second chamber. The quantity of flowing air through the nozzles will increase from chamber to chamber and thus the sub-pressure in the chambers will become greater.

When greater impedance develops in the material handling hose, however, air pressure levels within the three chambers changes until the pressure differential increases sufficiently to cause the third stage check valve 37 to close. Under this condition, only the first two stages are supplying vacuum to the collection drum, so that the overall airflow is reduced while the vacuum level at this point is much higher than in the free flow situation due to the higher pressure in the first two stages. As greater impedance develops, such as occurs during liquid pick-up, air pressure levels within the three stages again changes and reaches a point where the check valve governing airflow into the second stage shuts off so that stage one is the sole supplier of vacuum to the collection drum. The air pumping pressure and volume of the injector will thus automatically match the system requirement at each instant.

By way of example, a suitable engine of the type described above may have a length of 65" from front to back, a width of 8", and a height from the open base to the top of the engine of 9.5", with the adapter being arranged to fit on a 55 gallon open top drum. A suitable material for the housing is aluminum, which will result in an engine with the above dimensions having a weight of 18 pounds. This relatively small and light engine, which has no moving parts except for the check valves, provides an air consumption of 167 cfm @ 110 psi input, a static lift of 23 in Hg @ 110 psi input, and a no load vacuum airflow of 850 cfm. The operating characteristics of the three stages are as follows: 0–23 in. Hg. lift, 167 to 358 cfm throughput for the first stage consisting of chamber 38 and venturi tube 33; 0–8 in. Hg. lift, 167 to 566 cfm throughput for the second stage consisting of chamber 44 and venturi tube 43; and 0 to 23 in. Hg lift, 167 to 850 cfm throughput for the third stage consisting of chamber 47 and venturi tube 46, which is conveniently formed by the housing 30.

It will of course be appreciated by those skilled in the art that the size, operating characteristics, and construction of the engine are given by way of example only and that details such as the size, weight, and materials of the engine may be freely varied to meet the requirements of applications other than soil excavation, such as roadwork cleanup, gutter cleaning, chimney and smoke cleaning, hazardous waste recovery, directional drilling mud removal, leaf collection, aggregate transfer, and other applications which may occur to those skilled in the art, without departing from the scope of the invention.

Figure 8:
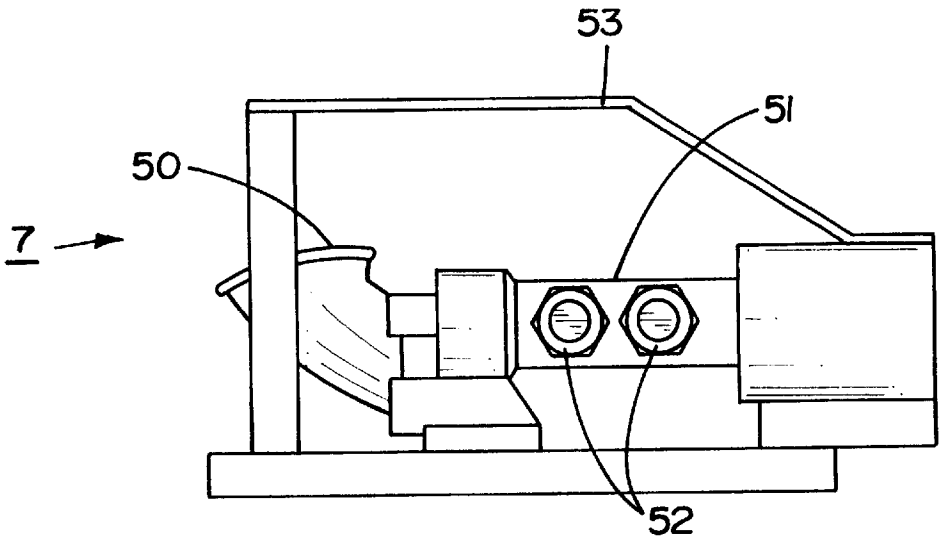
FIG. 8 is a plan view of a foot controlled valve for use with the excavation system of the preferred embodiment of the invention.

To reduce overall compressed air consumption, foot operated valve, as shown in FIG. 8, controls the compressed air supply to the vacuum engine in an essentially on/off mode of operation, allowing more efficient use of the compressed air by permitting the operator to instantly turn the vacuum on and off. The valve includes a pedal 50, valve 51 with air hose fittings 52, and a protective cage 53, and also serves as a safety mechanism by allowing air to pass when foot pressure is applied. Optionally, to prevent operators from bypassing this safety feature, the air connection at the back of the vacuum engine can be provided with a JIC threaded fitting, instead of the Chicago type quick connections used for the other air connections throughout the system.

Having thus described various preferred embodiments of the invention, those skilled in the art will appreciate that variations and modifications of the preferred embodiment may be made without departing from the scope of the invention. It is accordingly intended that the invention not be limited by the above description or accompanying drawings, but that it be defined solely in accordance with the appended claims.

I claim:

1. An excavation system, comprising:

a compressed air supply;

[an air lance including a nozzle including an orifice which forms a means for directing air from said compressed air supply at supersonic velocities towards a material to be excavated;]

a vacuum engine having an inlet connected to said compressed air supply*;*

*a collection drum; and*

*an adapter fitted on said collection drum, said adapter having a first opening in communication with an opening at the bottom of the vacuum engine and a second opening arranged to receive excavated material,* said vacuum engine comprising:

a housing having a front wall, two side walls, a rear wall, and a top wall, but which is open at the bottom and is internally divided into first, second, and third chambers, said inlet being situated in said front wall and opening into said first chamber;

a first venturi tube connecting said first and second chambers;

a second venturi tube connecting said second and third chambers; and a third venturi tube which extends through said rear wall to form a low pressure outlet for said third chamber;

a first pressure sensitive check valve positioned in said second chamber between said bottom opening and said second venturi tube; and a second pressure sensitive check valve positioned in said third chamber between said bottom opening and said third venturi tube[;

a collection drum; and an adapter fitted on said collection drum, said adapter having a first opening in communication with said opening at the bottom of the vacuum engine and a second opening arranged to receive excavated material].

2. An excavation system as claimed in claim 1, wherein said third venturi tube is larger than said second venturi tube, which is larger than said first venturi tube.

3. An excavation system as claimed in claim 1, wherein said excavated material is transported to said drum by a hose.

4. An excavation system as claimed in claim 1, wherein said excavated material is transported to said drum by a hose and pipe.

5. An excavation system as claimed in claim 1, *further comprising an air lance including a nozzle including an orifice which forms a means for directing air from said compressed air supply at supersonic velocities towards a material to be excavated,* wherein the air lance orifice is formed by a flattened end of a generally cylindrical main body.

6. An excavation system as claimed in claim 5, wherein a width of the orifice is less than 10 percent a diameter of the cylindrical main body.

7. An excavation system as claimed in claim 5, wherein a width of the orifice is less than approximately 0.02 inches.

8. An excavation system as claimed in claim 1, *further comprising an air lance including a nozzle including an orifice which forms a means for directing air from said compressed air supply at supersonic velocities towards a material to be excavated,* wherein said air lance further includes a handle extending transversely of a generally cylindrical main body of the air lance to enable the air lance to be rotated by an operator.

9. An excavation system as claimed in claim 8, wherein said handle includes a pipe connected to the air supply by means of a swivel fitting and a manually operated valve.

10. An excavation system as claimed in claim 1, *further comprising an air lance including a nozzle including an orifice which forms a means for directing air from said compressed air supply at supersonic velocities towards a material to be excavated,* wherein said nozzle has a concave lip which forms said orifice.

11. An excavation system as claimed in claim 1, further comprising a valve having a pedal and which is arranged to shut off said compressed air supply to the vacuum engine unless an operator is applying pressure to the pedal.

* * * * *